United States Patent [19]

Wakatake

[11] 4,417,241

[45] Nov. 22, 1983

[54] MAGNETICALLY OPERATED MATRIX DISPLAY PANEL AND ELEMENTS THEREFOR

[75] Inventor: Masayuki Wakatake, Tokyo, Japan

[73] Assignee: Yugen-Kaisha Wakatake Giken, Tokyo, Japan

[21] Appl. No.: 277,828

[22] Filed: Jun. 26, 1981

[30] Foreign Application Priority Data

Jul. 1, 1980 [JP] Japan ................................ 55-89332

[51] Int. Cl.³ ............................................ G06K 15/18

[52] U.S. Cl. ................................ 340/815.05; 40/449; 340/815.09; 340/815.26; 340/764

[58] Field of Search .................. 390/373, 378.2, 378.6, 390/378.5, 764; 40/449, 503; 340/815.26, 815.27, 815.24, 815.05, 815.04, 815.09, 815.08, 764

[56] References Cited

U.S. PATENT DOCUMENTS 4,177,458 12/1979 Wakatake ......................... 340/378.5

4,264,906 4/1981 Wakatake ............................ 340/764

*Primary Examiner*—Glen R. Swann, III

*Attorney, Agent, or Firm*—Gerald J. Ferguson, Jr.; Joseph J. Baker

[57] ABSTRACT

A display panel which is provided with a display surface structure having a large number of display elements rotatably arranged in a vertical plane. The display elements are each formed by a block member having a plurality of display surfaces of different colors and a plurality of magnetic pieces. One of the magnetic pieces is shorter than the others in a lateral direction. By successive movement of head assemblies, each comprised of a first erasing head, a second erasing head and a writing head, one or more of the display elements are turned to bring a predetermined one of their display surfaces to the front of the display surface to erase a display of a character, graph, pattern or the like provided thereon, thereafter bringing a selected one of the display surfaces of a selected display element or elements to the front of the display surface to provide thereon a display of a character, graph, pattern or the like.

6 Claims, 12 Drawing Figures

Fig. 11

| Before Erasing | | $d_1$ | $d_2$ | $d_3$ | $d_4$ |
|---|---|---|---|---|---|
| Heads | Magnets | | | | |
| $E_i$ | 101 | $d_1$ | $d_3$ | $d_4$ | $d_1$ |
| | 102 | $d_1$ | $d_4$ | $d_1$ | $d_1$ |
| | 103 | $d_1$ | $d_1$ | $d_1$ | $d_1$ |
| $F_i$ | 104 | $d_2$ | $d_2$ | $d_2$ | $d_2$ |
| After Erasing | | $d_2$ | $d_2$ | $d_2$ | $d_2$ |

Fig. 12

| Information | | (0,0) | (0,1) | (1,0) | (1,1) |
|---|---|---|---|---|---|
| Before Writing | | $d_2$ | $d_2$ | $d_2$ | $d_2$ |
| Head | Magnets | | | | |
| $G_i$ | 105 | $d_2$ | $d_3$ | $d_3$ | $d_3$ |
| | 106 | $d_2$ | $d_3$ | $d_4$ | $d_4$ |
| | 107 | $d_2$ | $d_3$ | $d_4$ | $d_1$ |
| After Writing | | $d_2$ | $d_3$ | $d_4$ | $d_1$ |

MAGNETICALLY OPERATED MATRIX DISPLAY PANEL AND ELEMENTS THEREFOR

BACKGROUND OF THE INVENTION

1. Field of the Invention

This invention relates to a display panel which has a large number of display elements arranged in the same vertical plane to provide a display of a character, graph, pattern or the like, and display elements for use in the display panel.

2. Description of the Prior Art

Display panels of this type are employed for providing a display of a traffic sign, a directional sign, an advertisement, time, date or like information. Display elements used in the past are usually formed by electro-photo conversion elements, and hence are of large power consumption. Further, the conventional display elements are readily broken by an external force and short-lived. Also there have been proposed display panels of the type employing display elements, each formed by a block member having a plurality of display surfaces of different colors, but these panels are defective in that the contents of displays cannot easily be changed.

SUMMARY OF THE INVENTION

Accordingly, this invention is to provide a novel display panel free from the abovesaid defects of the prior art and display elements for use in the display panel.

BEIEF DESCRIPTION OF THE DRAWINGS

FIGS. 11 and 12 are tables showing a sequence of change of the front display surface of each display element during erasing and writing, respectively.

DESCRIPTION OF THE PREFERRED EMBODIMENTS

Figure 1:
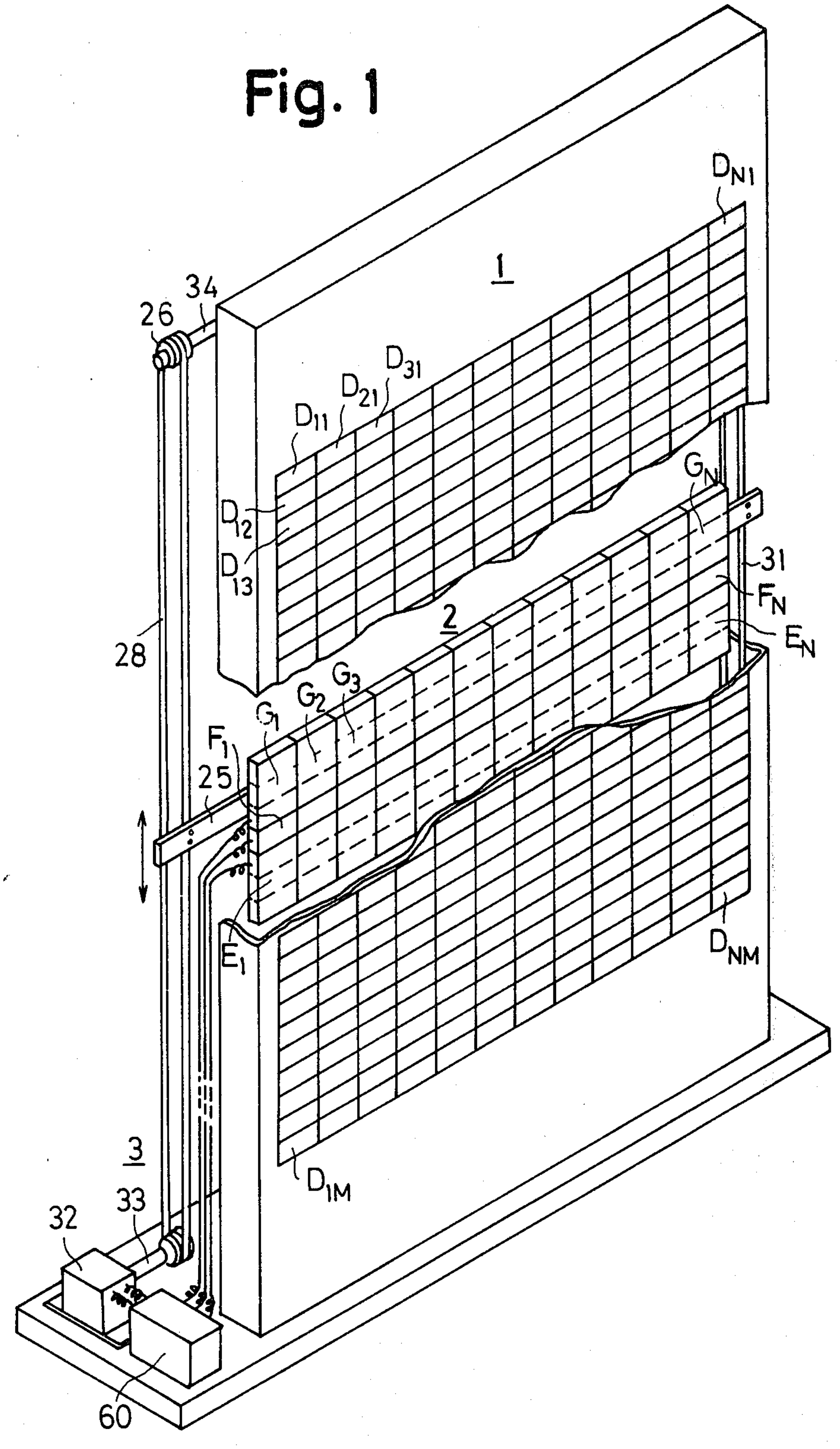
FIG. 1 is a perspective view, partly cut away, schematically showing an embodiment of the display panel of this invention.

FIG. 1 illustrates an embodiment of a display device of this invention, which is composed of a display surface structure 1, a display switching unit 2 and a drive unit 3.

Figure 3:
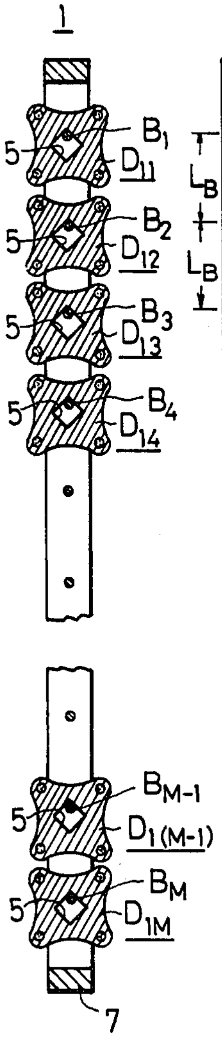
FIG. 3 is a sectional view taken on the line III—III in FIG. 2.
Figure 2:
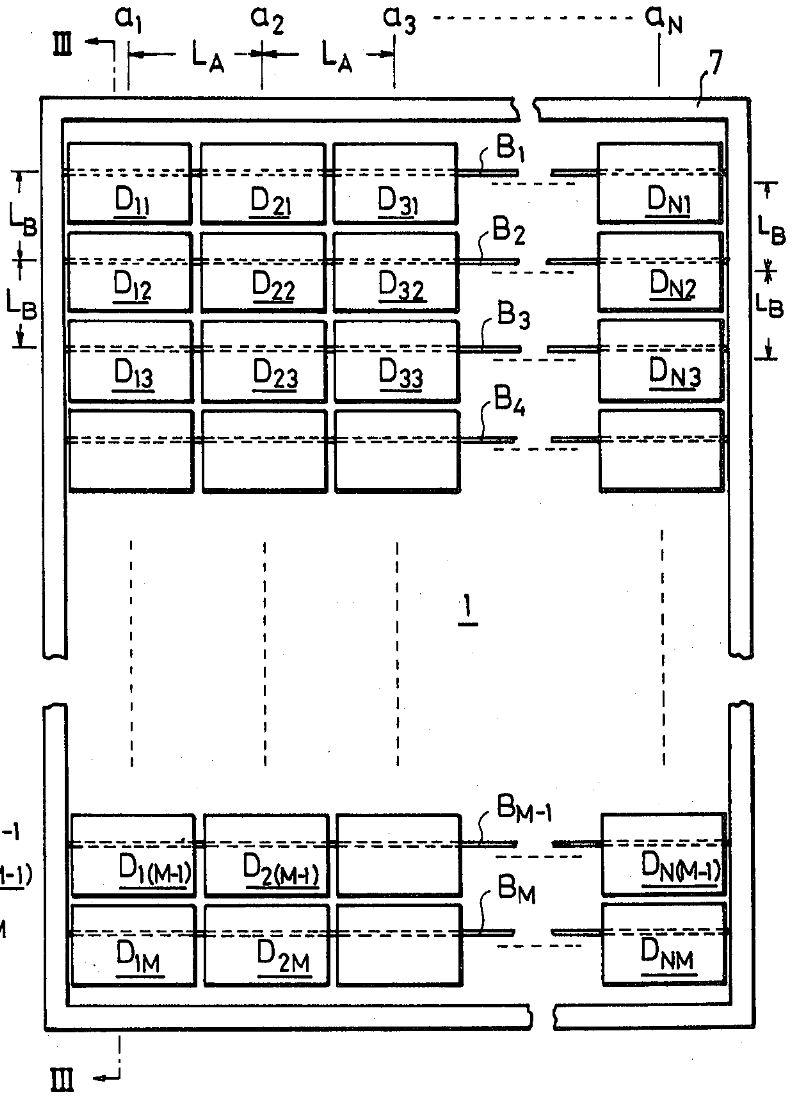
FIG. 2 is a front view of an example of a display surface structure of the display panel depicted in FIG. 1.
Figure 4:
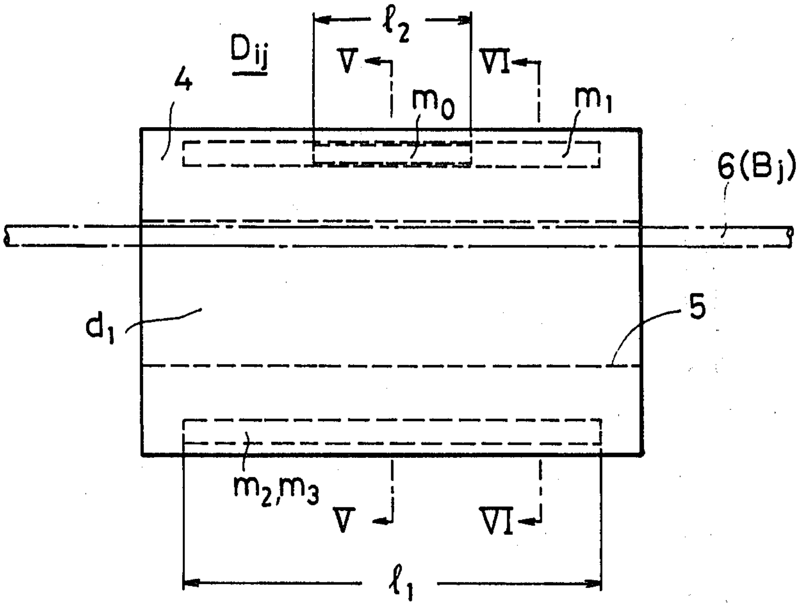
FIG. 4 is a front view of an example of a display element of this invention.
Figure 5:
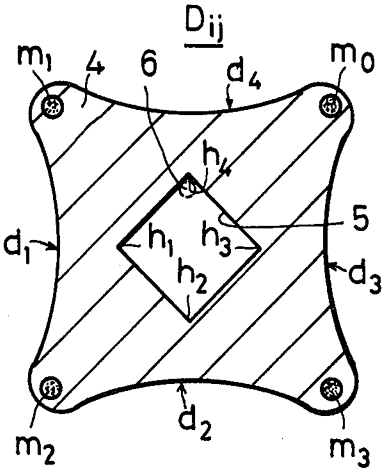
FIG. 5 is a sectional view taken on the line V—V in FIG. 4.
Figure 6:
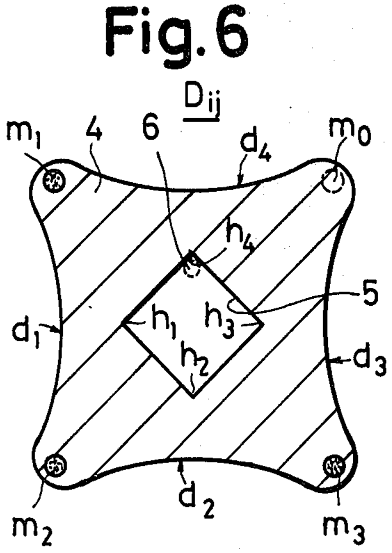
FIG. 6 is a sectional view taken on the line VI—VI in FIG. 4.

In the example of the display surface structure 1 such as shown in FIGS. 2 and 3, letting N vertical lines of arrangement spaced a predetermined distance $L_A$ from adjacent ones of them in a horizontal direction be represented by $a_1, a_2, \ldots a_N$, respectively, M display elements $D_{i1}, D_{i2}, \ldots D_{im}$ are disposed on the vertical line $a_i$ ($i=1, 2, \ldots N$) at predetermined intervals $L_B$ in a vertical direction. In this instance, the display element $D_{ij}$ ($j=1, 2, \ldots M$) has a construction such, for example, as shown in FIGS. 4, 5 and 6 in which a four-sided right prismatic member 4 formed as of a synthetic resin material has two pairs of opposed display surfaces $d_1$ and $d_3$ and $d_2$ and $d_4$ of different colors and has a square cross section. The display element $D_{ij}$ has embedded therein magnetic pieces $m_1$, $m_2$, $m_3$ and $m_0$ at the parallel edges between the display surfaces $d_1$ and $d_4$, between $d_1$ and $d_2$, between $d_2$ and $d_3$ and between $d_3$ and $d_4$, respectively. Each of the magnetic pieces $m_1$, $m_2$ and $m_3$ extends laterally and its length $l_1$ has a value close to the width of the member 4. The magnetic piece $m_0$ also extends laterally but its length $l_2$ is smaller than the length $l_1$. The magnetic piece $m_0$ is disposed centrally of the member 4 in its widthwise direction, and consequently it lies opposite only the central portions of the magnetic pieces $m_1$, $m_2$ and $m_3$. Further, a shaft receiving hole 5 is formed in the display element $D_{ij}$ in such a manner that when the latter is supported by a shaft 6, the pair of opposed display surfaces $d_1$ and $d_3$ or $d_2$ and $d_4$ may lie in vertical planes, respectively. The shaft receiving hole 5 of the display element $D_{ij}$ has a square cross section and is formed so that its two pairs of opposed corners are respectively spaced an angular distance of 45° apart from the parallel edges of the four-sided right prismatic member 4. Letting the corners of the hole 5 corresponding to the display surfaces $d_1$, $d_2$, $d_3$ and $d_4$ be represented by $h_1$, $h_2$, $h_3$ and $h_4$, respectively, when a shaft 6 loosely inserted into the hole 5 as indicated by the chain line engages with either one of the corners $h_4$ and $h_2$, the display surfaces $d_1$ and $d_3$ lie in vertical planes and when the shaft 6 engages with either one of the corners $h_1$ and $h_3$, the display surfaces $d_2$ and $d_4$ lie in vertical planes. The abovesaid display elements $D_{i1}, D_{i2}, \ldots D_{iM}$ are supported by horizontal shafts $B_1, B_2, \ldots B_M$ loosely inserted into the shaft receiving holes 5, respectively, the horizontal shafts being supported by a frame 7 and arranged in side-by-side and parallel relation at the aforesaid intervals $L_B$, for example, in the vertical direction. Therefore, the display surfaces $d_1$, $d_2$, $d_3$ or $d_4$ of the display elements $D_{11}$ to $D_{N1}$, $D_{12}$ to $D_{N2}$, $\ldots$ $D_{1M}$ to $D_{NM}$ which face forwardly lie in the same vertical plane.

Figure 7:
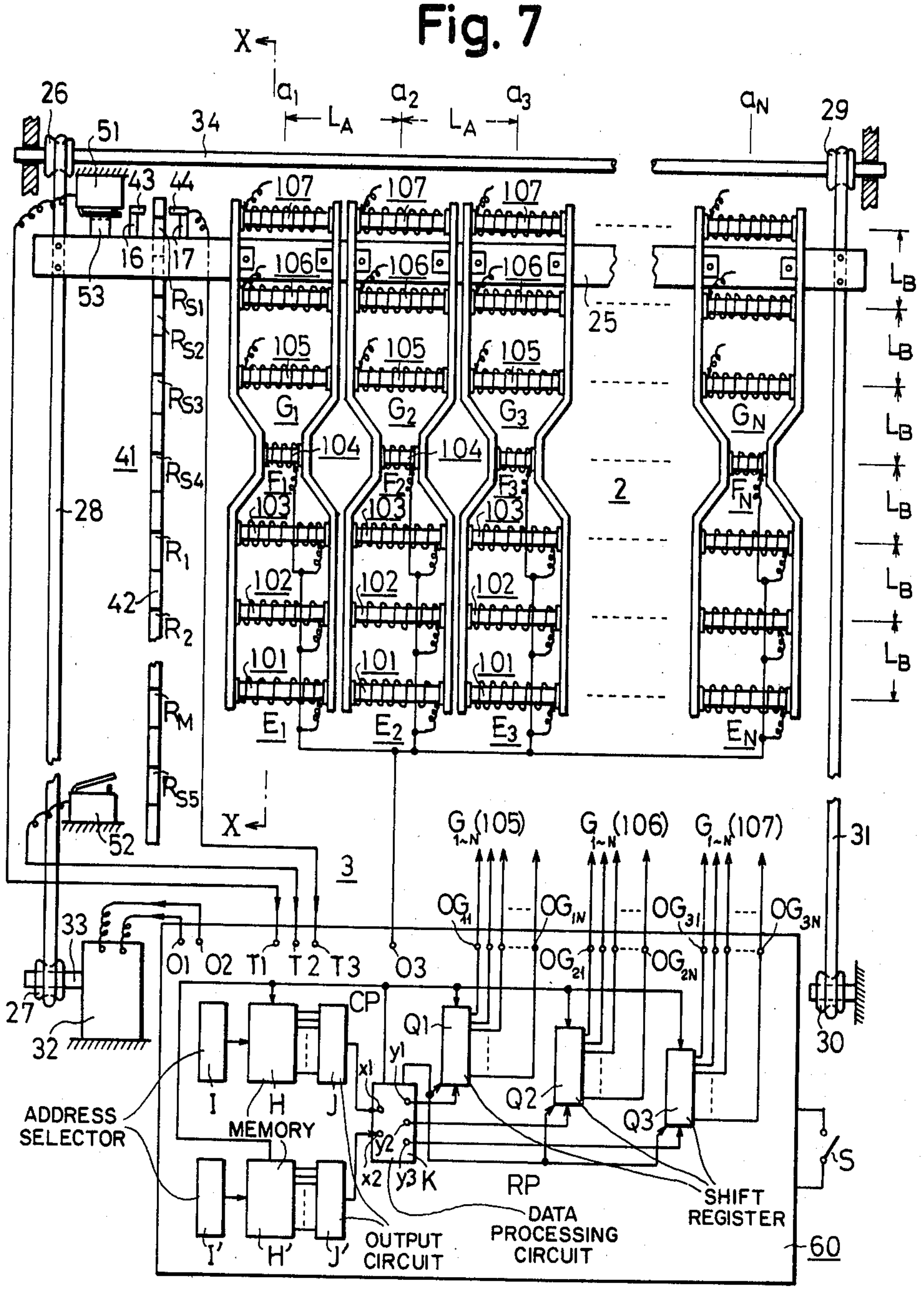
FIG. 7 shows in elevation an example of a display switching and an example of the circuit construction of a drive unit for use in display panel of this invention.
Figure 8:
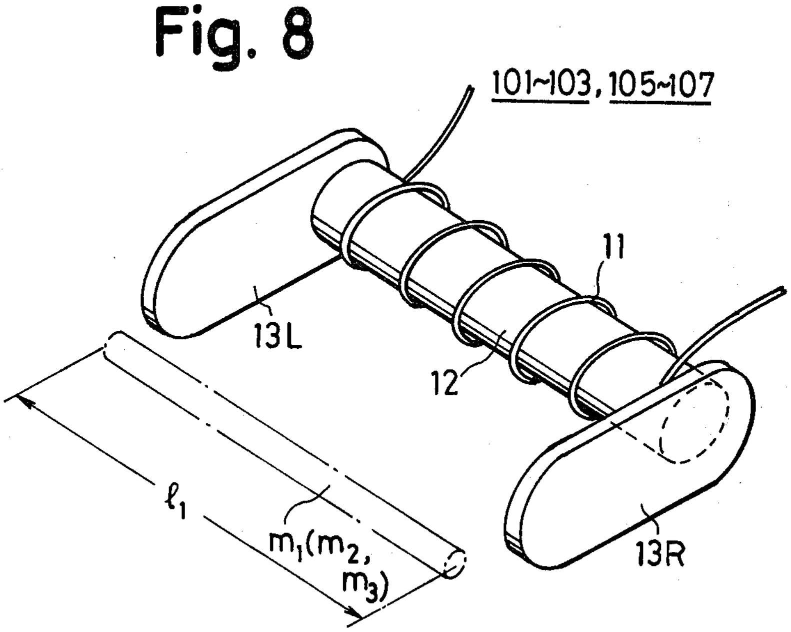
FIG. 8 is a perspective view schematically showing, by way of example, one of the electromagnets forming each of first erasing heads and writing heads.
Figure 9:
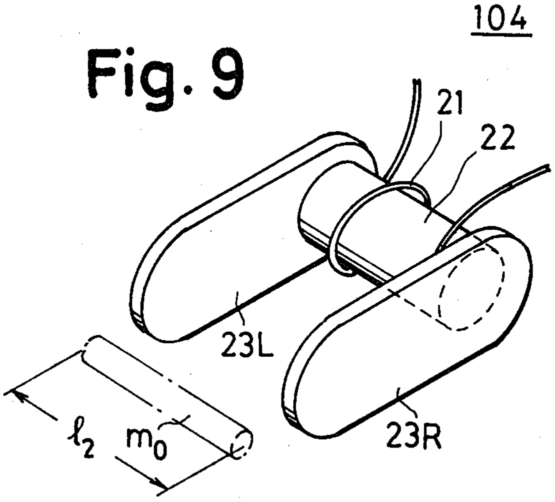
FIG. 9 is a perspective view schematically showing, by way of example, an electromagnet forming each of second erasing heads.

An example of the display switching unit 2 has a first erasing head $E_i$, a second erasing head $F_i$ and a writing head $G_i$, as shown in FIG. 7. The first erasing head $E_i$ has three electromagnets 101, 102 and 103 arranged upwardly in this order at the interval $L_B$ referred to previously in respect of FIG. 2. As seen in FIG. 8, each of the electromagnets 101, 102 and 103 comprises a magnetic core 12 circular in cross section and having wound thereon a coil 11 and magnetic plates 13L and 13R respectively attached to both ends of the magnetic core 12 so that they coextend in a direction substantially perpendicular to the lengthwise direction of the magnetic core 12. The magnetic core 12 and the magnetic plates 13L and 13R make up each of the electromagnets 101, 102 and 103. In the illustrated case, the magnetic plates 13L and 13R are spaced apart a distance substantially equal to the length $l_1$ of the magnetic pieces $m_1$, $m_2$ and $m_3$ of the aforesaid member 4 of the display element $D_{ij}$ in the lateral direction. The second erasing head $F_i$ has one electromagnet 104. As seen in FIG. 9, the electromagnet 104 comprises a magnetic core 22 circular in cross section and having wound thereon a coil 21 and magnetic plates 23L and 23R respectively attached to both ends of the magnetic core 22 so that they coextend in a direction substantially perpendicular to the lengthwise direction of the magnetic core 22. The magnetic core 22 and the magnetic plates 23L and 23R make up the electromagnet 104. In the illustrated case, the magnetic plates 23L and 23R are spaced apart a distance substantially equal to the length $l_2$ of the magnetic piece $m_0$ of the aforesaid block 4 of the display element $D_{ij}$ in the lateral direction. The writing head $G_i$ has three electromagnets 105, 106 and 107 arranged upwardly in this order at the intervals of $L_B$ as mentioned above. The electromagnets 105, 106 and 107 are each identical in construction with the abovesaid electromagnets 103 to 105; therefore, no detail description will be repeated. A horizontal rod 25 is provided behind the display surface structure 1 in a manner to be movable up and down in parallel therewith. The first and second erasing heads $E_i$ and $F_i$ and the writing head $G_i$ are mounted on the horizontal rod 25 at a position opposite the aforementioned vertical line $a_i$ in such a manner that the front end faces of the magnetic plates 13L and 13R of the electromagnets 101 to 103 and 105 to 107 of the first erasing head $E_i$ and the writing head $G_i$ and the magnetic plates 23L and 23R of the electromagnet 104 of the second erasing head $F_i$ may lie adjacent the display surfaces $d_1$ to $d_4$ of the display element $D_{ij}$.

Figure 10:
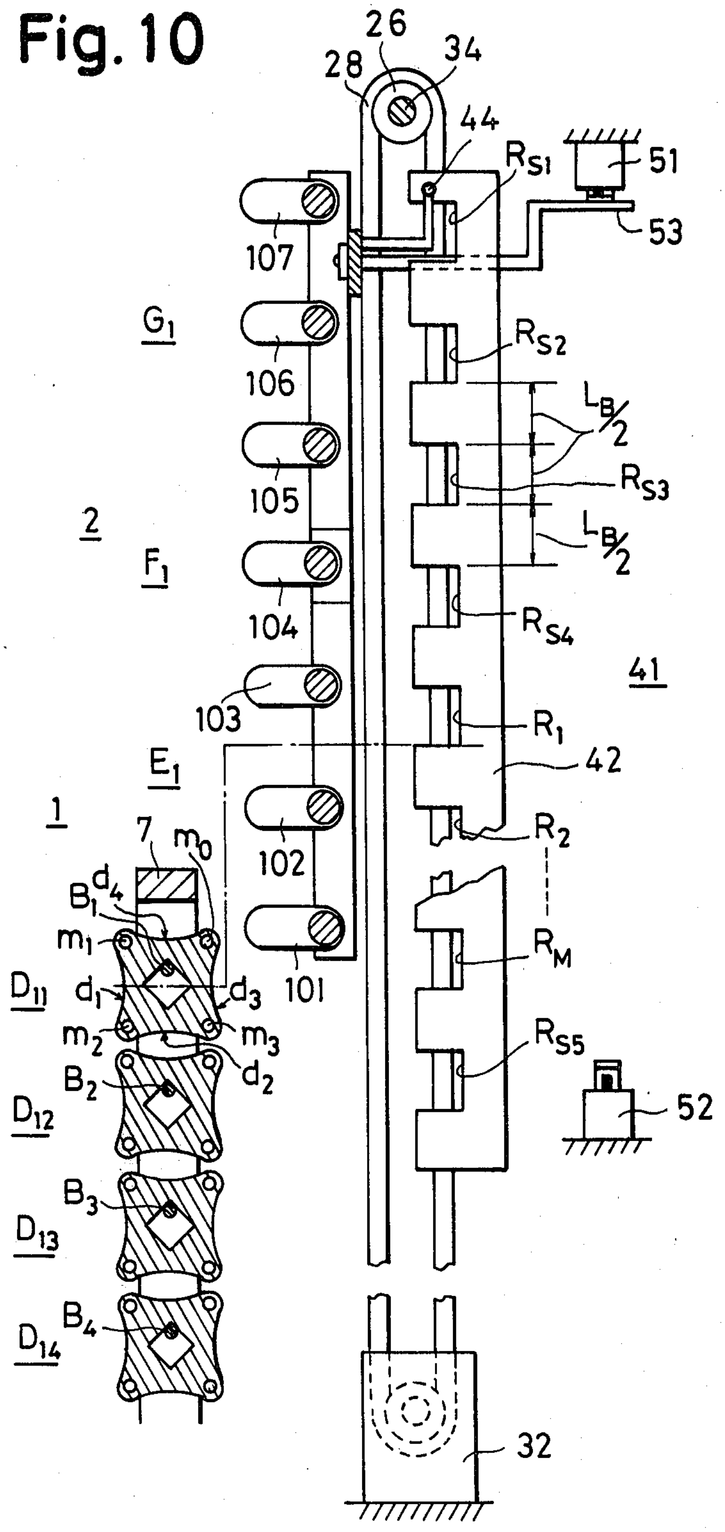
FIG. 10 is a sectional view taken on the line X—X in FIG. 7.

An example of the drive unit 3 has a belt, chain or like strap member 28 installed between a pair of pulleys 26 and 27 disposed in the vertical direction, for instance, on the left of the display surface structure 1 and spaced a predetermined distance apart and a similar strap member 31 installed between a pair of pulleys 29 and 30 likewise disposed in the vertical direction on the right of the display surface structure 1 and spaced a predetermined distance apart. The horizontal rod 25 of the abovesaid display switching unit 2 is secured at both ends to the strap members 28 and 31. A rotary shaft 33 of a motor 32 is coupled, for instance, to the pulley 27 and a shaft 34 is bridged between the pulleys 26 and 29 so that the strap members 28 and 31 may be driven by the rotation of the motor 32 up or down in synchronism with each other. Accordingly, the horizontal rod 25 is moved up and down while being held horizontal. The drive unit 3 has a detecting mechanism 41 for detecting the position of the horizontal rod 25. An example of the detecting mechanism 41 has, as shown in FIGS. 7 and 10, a position detecting plate 42 which is disposed on the left hand side of the display elements $D_{11}$, $D_{12}$, . . . $D_M$ to extend in the vertical direction and whose front marginal edge has rectangular recesses $R_1$ to $R_M$. The recess $R_j$ extends upwardly from the position corresponding to the center of the display element $D_{ij}$ in the vertical direction to a position spaced a distance equal to $\frac{1}{2}$ of the interval $L_B$ from the abovesaid position, and light emitting element 43 and photo detector 44 which are disposed in opposing relationship with each other with the position detecting plate 42 interposed therebetween. The light emitting element 43 and the photo detector 44 are mounted on the supporting members 16 and 17 respectively planted on the horizontal rod 25. The photo detector 44 provides a detected output "1" or "0" in the binary representation depending on whether the recess $R_j$ exists or not between the photo detector 44 and the light emitting element 43. In practice, the position detecting plate 44 has at least the aforesaid recesses $R_1$ to $R_M$ and similar recesses $R_{S1}$, $R_{S2}$, $R_{S3}$, $R_{S4}$ and $R_{S5}$. The recesses $R_{S4}$, $R_{S3}$, $R_{S2}$ and $R_{S1}$ are formed in this order at the intervals $L_B$ upwardly of the position spaced the distance $L_B$ from the uppermost recess $R_1$ and the recess $R_{S5}$ is disposed downwardly of the lowermost recess $R_M$ at a position spaced therefrom the distance $L_B$.

Further, the drive unit 3 has detecting switches 51 and 52 for detecting the uppermost and lowermost positions of the horizontal rod 25, respectively. The detecting switch 51 is adapted to provide an output "1" in the binary representation upon engagement with an engaging piece 53 of the horizontal rod 25 when the magnetic plates 13L and 13R of the lowermost electromagnet 101 of the first erasing head $E_i$ mounted on the horizontal rod 25 are moved out of the opposing relation with the display element $D_{i1}$. The detecting switch 52 is similarly adapted to provide an output "1" in the binary representation upon engagement with an engaging piece 53 of the horizontal rod 25 when the magnetic plates 13L and 13R of the uppermost electromagnet 107 of the writing head $G_i$ are moved out of the opposing relation with the display element $D_{iM}$. Moreover, the drive unit 3 has a drive circuit 60 for driving the first and second erasing heads $E_i$ and $F_i$ and the writing head $G_i$ of the display switching unit 2.

The drive circuit 60 comprises, for instance, memory circuits H and H', address selector circuits I and I', output circuits J and J', a data processing circuit K and shift registers Q1, Q2 and Q3. The memory circuits H and H' are designed to store information "0" and "0", "0" and "1", "1" and "0" or "1" and "1", for selecting the display surfaces $d_1$, $d_2$, $d_3$ and $d_4$ of the display elements $D_{11}$ to $D_{N1}$, $D_{12}$ to $D_{N2}$, . . . $D_{1M}$ to $D_{NM}$ of the display elements $D_{11}$ to $D_{N1}$ of the display surface structure 1. That is, in each of the memory circuits H and H', N information of the display elements $D_{11}$ to $D_{N1}$ are stored as first parallel information at a first address, N information of the display elements $D_{12}$ to $D_{N2}$ are stored as second parallel information at a second address, . . . and N information of the display elements $D_{1M}$ to $D_{NM}$ are stored as Mth parallel information at an Mth address. The N information making up the jth parallel information stored at the jth address selected by each of the address selector circuits I and I' are read out one by one upon each occurrence of a read control pulse from the data processing circuit K. Each of the address selector circuits I and I' is adapted to sequentially select the first, second, . . . Mth address of each of the memory circuits H and H' for sequentially reading out the M parallel information stored in each of the memory circuits H and H'. The output circuits J and J' receive and output the N jth parallel information read out of the memory circuits H and H', respectively.

The data processing circuit K receives the sequential information from the output circuits J and J' to generate pulses upon each reception of the information, which pulses are applied as a read control pulse and a shift pulse to the memory circuits H and H' and the shift registers Q1, Q2 and Q3, respectively. The data processing circuit K is also adapted to provide a reset pulse RP for resetting the shift registers Q1, Q2 and Q3. Each of the shift registers Q1, Q2 and Q3 has first to Nth digits and is designed so that the N information sequentially applied from the data processing circuit K are stored at the N digits, respectively, and are simultaneously read out thereof. The data processing circuit K has two information input terminals x1 and x2 and three information output terminals y1, y2 and y3 and is adapted so that the information from the output circuits J and J' may be applied to the information input terminals x1 and x2, respectively. Moreover, three shift registers Q1, Q2 and Q3 are provided and information from the information output terminals y1, y2 and y3 of the data processing circuit K are applied to information input terminals of the shift registers Q1, Q2 and Q3, respectively.

Further, the drive circuit 60 has input terminals T1 and T2 supplied with the detected outputs from the aforesaid detecting switches 51 and 52, respectively, an input terminal T3 supplied with the detected output from the photo detector 44, output terminals 01 and 02 connected to forward and backward revolution input sides of the motor 32, respectively, output terminals $OG_{11}$ to $OG_{1N}$, $OG_{21}$ to $OG_{2N}$ and $OG_{31}$ to $OG_{3N}$, an output terminal 03 and a power source switch S. The output terminal $OG_{1i}$ is connected to the electromagnet 105 of the writing head $G_i$, the output terminal $OG_{2i}$ to the electromagnet 106 and the output terminal $OG_{3i}$ to the electromagnet 107. The output terminal 03 is connected to the coils 11 of the electromagnets 101 to 103 of the first erasing heads $E_1$ to $E_N$ and to the coils 21 of the electromagnets 104 of the second erasing heads $F_1$ to $F_N$. When the horizontal rod 25 of the display switching unit 2 lies at its uppermost position to maintain the detecting switch 51 in its ON state, if the power source switch S is turned ON for a very short period of time, output signals are derived from the output terminals 01 and 03. While the output signals are obtained from the output terminals 01 and 03, if the detected output "0" in the binary representation is supplied from the photo detector 44 to the input terminal T3 after counting four detected outputs "1", then the output "0" in the binary representation is supplied to the input terminal T3 from the photo detector 44 in the state that the address selector circuits I and I', the memory circuits H and H', the data processing circuit K and the shift registers Q1, Q2 and Q3 are controlled so that information stored in the memory circuits H and H' are supplied via the output circuits J and J' to the data processing circuit K. At this time, N pulses CP are sequentially provided from the data processing circuit K and the shift registers $Q_1$, $Q_2$ and $Q_3$ are sequentially shifted upon occurrence of each of the N pulses CP. The data processing circuit K provides at its output terminals y1, y2 and y3 information "0", "0" and "0", respectively, in the case of the information from the memory circuits H and H' being "0" and "0", and information "1", "0" and "0" in the case of the latter information being "0" and "1". When the information from the memory circuits H and H' are "1" and "0", the data processing circuit K provides information "1", "0" and "0" at its output terminals y1, y2 and y3, respectively, and then if an output "0" in the binary representation is provided from the photo detector 44 in the above state, the information "1", "0" and "0" at the output terminals y1, y2 and y3 change to "0", "1" and "0", respectively. In the case of the information from the memory circuits H and H' being "1" and "1", the data processing circuit K provides information "1", "0" and "0" and then, if the output "0" is obtained from the photo detector 44 in the above state, the information at the output terminals y1, y2 and y3 change to "0", "1" and "0", respectively, and thereafter, if the output "0" is derived from the photo detector 44 in this state, the information at the abovesaid three output terminals change to "0", "0" and "1", respectively. The information thus obtained are successively stored in the shift registers Q1, Q2 and Q3. Then, when the output from the photo detector 44 to be supplied to the input terminal T3 becomes "1", the information stored in the shift registers Q1, Q2 and Q3 are derived at the output terminals $OG_{11}$ to $OG_{1N}$, $OG_{21}$ to $OG_{2N}$ and $OG_{31}$ to $OG_{3N}$, respectively. And then, when the output from the photo detector 44 is altered to "0", no outputs are provided at the output terminals $OG_{11}$ to $OG_{1N}$, $OG_{21}$ to $OG_{2N}$ and $OG_{31}$ to $OG_{3N}$. At the same time, the shift registers Q1, Q2 and Q3 are reset and, as described above, the address selector circuits I and I', the memory circuits H and H', the data processing circuit G and the shift registers Q1, Q2 and Q3 are respectively controlled so that information stored at the next address is successively read out of the memory circuits H and H', and, as is the case with the above, the data processing circuit K is actuated and the information therefrom are stored in the shift registers Q1, Q2 and Q3, respectively. Then, when the output from the photo detector 44 is altered again to "1", the information stored in the shift registers Q1, Q2 and Q3 are derived at the output terminals $OG_{11}$ to $OG_{1N}$, $OG_{21}$ to $OG_{2N}$ and $OG_{31}$ to $OG_{3N}$, respectively, in the same manner as mentioned above and thereafter such operations are repeated. Further, when the detected output "1" in the binary representation is supplied from the detecting switch 52 to the input terminal T2, no output is obtained from the output terminals 01 and 03.

The above is the construction of an example of the display panel employing the display elements of the embodiment of this invention. With such a construction, by turning on the power source switch S of the drive circuit 60 of the drive unit 3 for a very short period of time with the horizontal rod 25 of the display switching unit 2 being located at its uppermost position to hold the detecting switch 51 in its ON state, the horizontal rod 25 is moved down. While the horizontal rod 25 is lowered, the output "1" is yielded at the output terminal 03 of the drive circuit 10, so that the erasing heads $E_1$ to $E_N$ and $F_1$ to $F_N$ are energized. By the downward movement of the horizontal rod 25, the electromagnets 101, 102 and 103 of the erasing head $E_i$ are brought down into opposing relation to the display element $D_{ij}$ one after another and then the electromagnet 104 of the erasing head $F_i$ is brought down into opposing relation to the display element $D_{ij}$. As a result of this, such operations as described below are selectively carried out depending on which one of the display elements $d_1$ to $d_4$ of the display element $D_{ij}$ lies on the front side of the display panel before the electromagnets 101, 102, 103 and 104 are brought down into opposing relation to the display element $D_{ij}$ one after another, that is, "Before Erasing"; ultimately, the display surface $d_2$ of the display element $D_{ij}$ is brought to the front side of the display panel.

(A) In the case where the display surface $d_1$ of the display element $D_{ij}$ lies on the front side of the display panel "before erasing":

The magnetic piece $m_0$ of the small length $l_2$ lies near the rear upper edge of the display element $D_{ij}$. By the way, the electromagnets 101 to 103 each have the pair of magnetic plates 13L and 13R spaced apart the distance corresponding to the length $l_1$ larger than the length $l_2$ of the magnetic piece $m_0$, as described previously in respect of FIG. 8. On the other hand, the electromagnet 104 has the pair of magnetic plates 23L and 23R spaced apart the distance corresponding to the length $l_2$ of the magnetic piece $m_0$.

Accordingly, when the electromagnets 101, 102 and 103 move down along the back of the display element $D_{ij}$ in succession, the display element $D_{ij}$ is not turned, whereas when the electromagnet 104 is brought down across the display element $D_{ij}$, the latter is turned through 90° in the clockwise direction in FIG. 10, bringing its display surface $d_2$ to the front side.

(B) In the case where the display surface $d_2$ of the display element $D_{ij}$ lies on the front side of the display panel "before erasing":

The magnetic piece $m_1$ of the length $l_1$ lies near the rear upper edge of the display element $D_{ij}$. By successive confrontation of the electromagnets 101, 102 and 103 with the display element $D_{ij}$, the latter is turned through 90° upon each confrontation with the former, bringing the display surface $d_1$ of the display element $D_{ij}$ to the front side, with the magnetic piece $m_0$ lying near the rear upper edge of the display element $D_{ij}$. Accordingly, by the confrontation of the electromagnet 104 with the display element $D_{ij}$, the latter is turned through 90°, resulting in its display surface $d_2$ lying on the front side.

(C) In the case where the display surface $d_3$ of the display element $D_{ij}$ lies on the front side of the display panel "before erasing":

The magnetic piece $m_2$ lies near the rear upper edge of the display element $D_{ij}$. By successive confrontation of the electromagnets 101 and 102 with the display element $D_{ij}$, the latter is turned through 90° upon each confrontation, bringing the display surface $d_1$ of the display element $D_{ij}$ to the front side, with the magnetic piece $m_0$ lying near the rear upper edge of the display elements $D_{ij}$. Accordingly, when the electromagnet 103 is moved down across the display element $D_{ij}$, the latter is not turned. But when the electromagnet 104 is brought into confrontation with the display element $D_{ij}$, the latter is turned through 90°, resulting in its display surface $d_2$ lying on the front side.

(D) In the case where the display surface $d_4$ of the display element $D_{ij}$ lies on the front side of the display panel "before erasing":

The magnetic piece $m_3$ lies near the rear upper edge of the display element $D_{ij}$. By the confrontation of the electromagnet 101 with the display element $D_{ij}$, the latter is turned through 90° to bring its display surface $d_1$ to the front side, with the magnetic piece $m_0$ lying near the rear upper edge of the display element $D_{ij}$. Accordingly, the display element $D_{ij}$ is turned by successive confrontation therewith of the electromagnets 102 and 103. When the electromagnet 104 is brought down to the display element $D_{ij}$, the latter is turned through 90° to bring its display surface $d_2$ to the front side.

The above-described operations are tabulated in FIG. 11.

By successive confrontation of the photo detector 44 with the recesses $R_{S1}$, $R_{S2}$, $R_{S3}$, $R_{S4}$, $R_1$, $R_2$, . . . $R_M$ and $R_{S5}$ after the horizontal rod 25 starts its downward movement, the photo detector 44 yields the outputs "0" in succession, which are provided to the input terminal T3 of the drive circuit 60. As described previously, upon each occurrence of the output "0" after the application of four outputs "0" to the input terminal T3, the address selector circuits F and F', the memory circuits H and H', the data processing circuit G and the shift registers Q1, Q2 and Q3 of the drive circuit 60 are controlled to selectively energize the electromagnets 105, 106 and 107 of a selected one or ones of the writing heads $G_1$ to $G_N$ of the display switching unit 2 in accordance with the memory contents of the memory circuits H and H'. The electromagnets 105, 106 and 107 of the writing head $G_i$ are brought to the position opposite the display element $D_{ij}$ one after another in synchronism with successive generation of the abovesaid output "0" after the electromagnets 101 to 103 and 104 of the erasing heads $E_i$ and $F_i$ are moved across the display element $D_{ij}$. In other words, the successive confrontation with the display element $D_{ij}$ starts with the state in which the display surface $d_1$ of the display element $D_{ij}$ lies on the front side and consequently the magnetic piece $m_1$ stays near the rear upper edge of the display element $D_{ij}$. Accordingly, the display element $D_{ij}$ performs such operations as described below in accordance with the contents of the memory circuits H and H', whereby a selected one of the display surfaces $d_1$ to $d_4$ of the display element $D_{ij}$ is brought to the front side according to the contents of the memory circuits H and H'.

(E) In the case where the contents of the memory circuits H and H' are both "0":

When the electromagnets 105, 106 and 107 confront the display element $D_{ij}$ one after another, these electromagnets are respectively supplied with outputs "0", and hence they are not energized. Accordingly, the display element $D_{ij}$ is not turned, in consequence of which its display surface $d_2$ remains on the front side.

(F) In the case where the contents of the memory circuits H and H' are "0" and "1", respectively:

When the electromagnets 105, 106 and 107 sequentially confront the display element $D_{ij}$, these electromagnets are supplied with outputs "1", "0" and "0", respectively, and hence only the electromagnet 105 is energized. As a result of this, the display element $D_{ij}$ is turned through 90°, bringing its display surface $d_3$ to the front side.

(G) In the case where the contents of the memory circuits H and H' are "1" and "0", respectively:

When the electromagnets 105, 106 and 107 confront the display element $D_{ij}$ in a sequential order, these electromagnets are supplied with outputs "1", "1" and "0", respectively, and hence the electromagnets 105 and 106 are energized. Consequently, the display element $D_{ij}$ is turned through 180° to bring its display surface $d_4$ to the front side.

(H) In the case where the contents of the memory circuits H and H' are both "1":

When the electromagnets 105, 106 and 107 confront the display element $D_{ij}$ in succession, these electromagnets are all supplied with the outputs "1", and hence they are all energized. In consequence, the display element $D_{ij}$ is turned through 270° to bring its display surface $d_1$ to the front side.

The above-described operations are tabulated in FIG. 12.

When the horizontal rod 25 is brought down to its lowermost position to turn on the detecting switch 52 to derive therefrom a detected output "1", the output is no more produced from the output terminal Q2, stopping the motor 32 from rotating.

In accordance with the display panel using the display elements according to the above embodiment of this invention, the display surfaces $d_2$ of all the display elements $D_{11}$ to $D_{N1}$, $D_{12}$, to $D_{N2}$, . . . $D_{1M}$ to $D_{NM}$ can be made to face forwardly and a desired one of the display surfaces $d_1$, $d_3$ and $d_4$ of a desired one or ones of the display elements can be made to face forwardly. Accordingly, if the display surfaces $d_2$, $d_1$, $d_3$ and $d_4$ of the display element $D_{ij}$ are previously colored, for example in white, red, green and blue, respectively, a character, symbol, graph or pattern can be displayed in colors as desired. Such a display can be produced with a simple construction as a whole.

Further, since the display element $D_{ij}$ has such a simple construction as shown in FIGS. 4, 5 and 6, the distance between adjacent ones of the display elements can be made small; therefore, the overall apparatus can be simplified in construction and reduced in size correspondingly.

Morever, as the display element is free from power dissipation, the display panel does not consume much power and, in addition, as the display element is not readily broken by an external force, the display panel can be used without trouble for a long time.

As will be appreciated from the above, the display element according to the foregoing embodiment of this invention can be applied to construct a display panel which includes a number of such display elements arranged in the same vertical plane and which is capable of providing a character, graph, pattern or like display without much power consumption and with a long life.

Further, the present invention exhibits the advantages that the content of a display of a character, symbol, graph, pattern or the like can be changed by a single movement of the display switching unit 2 in one direction and that such a change does not take much time.

In the foregoing embodiment of the present invention it is preferred that the writing heads $G_1$ to $G_N$ of the display switching unit 2 be constructed so that those magnetic plates 13L or 13R of the electromagnets 105, 106 and 107 of the writing heads $G_{i-1}$ and $G_{i+1}$ lying on the side of the writing head $G_i$ may be of the same polarity. The advantage by this construction will be briefly described in connection with the electromagnets of the writing heads $G_{i-1}$, $G_i$ and $G_{i+1}$. Namely, in the case where the electromagnet 105 of the writing head $G_i$ is not energized but the electromagnets 105 of the writing heads $G_{i-1}$ and $G_{i+1}$ are energized, the electromagnet 105 of the writing head $G_i$ is not exposed to a magnetic field by the electromagnet 105 of the writing head $G_{i-1}$ and/or $G_{i+1}$. This eliminates the possibility of erroneous activation of the display elements $D_{i1}$ to $D_{iN}$.

The foregoing description should be construed as merely illustrative of the present invention and should not be construed in limiting sense. For example, the display element $D_{ij}$ need not be limited specifically to the foursided right prismatic block member 4 with the four display surfaces $d_1$ to $d_4$ but may be a multi-sided prismatic block member with plural (P) display surfaces of different colors. In this case, the magnetic pieces responsive to the first erasing head and the writing head are disposed in the block member near its (P−1) edges and a magnetic piece responsive to the second erasing head is disposed near the remaining one edge and (P−1) electromagnets are disposed in the first erasing head and the writing head correspondingly.

It is also possible to replace the combination of the shaft receiving hole 5 and the horizontal shaft loosely inserted thereinto, which is used as supporting means of the display element $D_{ij}$, for example, with a combination of a non-support surface provided in the display element $D_{ij}$ and perpendicular to each display surface and a horizontal plane receiving the non-support surface.

Moreover, the length $l_2$ of the magnetic piece $m_0$ of the display element $D_{ij}$ need not always be selected smaller than the lengths $l_1$ of the other magnetic pieces $m_1$ to $m_3$.

Besides, the structures of the heads $E_i$, $F_i$ and $G_i$ and the magnetic pieces $m_0$ and $m_1$ to $m_3$ of the display element $D_{ij}$ can be modified from those employed in the foregoing embodiment if the first erasing head $E_i$ and the writing head $G_i$ have such construction that acts on only the magnetic pieces $m_1$ to $m_3$ of the display element $D_{ij}$. Also it is possible to substitute the first and second erasing heads with permanent magnetic heads.

It will be apparent that many modifications and variations may be effected without departing from the scope of the novel concepts of this invention.

What is claimed is:

1. A display panel comprising:

a display surface structure;

a display switching unit; and a drive unit;

in which, letting an arrangement of N vertical lines of arrangement spaced a predetermined distance from adjacent ones of them in a horizontal direction be represented by $a_1$, $a_2$, . . . $a_N$, respectively, the display surface structure has M display elements $D_{i1}$, $D_{i2}$, . . . $D_{iM}$ disposed on the vertical line $a_i$ (i=1, 2, . . . N) at predetermined intervals in a vertical direction;

in which the display element $D_{ij}$ (j=1, 2, . . . M) is formed with a block member with uniform cross section having an outer periphery forming a plurality of display surfaces of different colors to form a plurality of edges parallel to and around an axis extending in the horizontal direction, a magnetic piece of a first type disposed near each of the edges except one of them and a magnetic piece of a second type disposed near the remaining edge, the display element $D_{ij}$ being supported by supporting means in a manner to be rotatable about the axis and to permit a selected one of the display surfaces to lie in a vertical plane;

in which the display switching unit has a first erasing head $E_i$, a second erasing head $F_i$ and a writing head $G_i$ disposed to be movable along each vertical line $a_i$ in the vertical direction, the first erasing head $E_i$ having magnets numbering one less than the edges of the block member, the second erasing head $F_i$ having a magnet, the writing head $G_i$ having electromagnets of the same number as the magnets of the first erasing head; and in which the drive unit has means for simultaneously moving down the first erasing heads $E_1$ to $E_N$, the second erasing heads $F_1$ to $F_N$ and the writing heads $G_1$ to $G_N$ and means for driving the electromagnets of the writing heads $G_1$ to $G_N$ in synchronism with the movement of the writing heads $G_1$ to $G_N$.

2. A display panel according to claim 1 wherein the block member forming the display element $D_{ij}$ is a four-sided right prismatic member, and hence has four parallel edges and four display surfaces and has three magnetic pieces of said first type, wherein the writing head $G_i$ has three electromagnets, and wherein the first erasing head $E_i$ has three magnets.

3. A display panel according to claim 1 wherein the magnetic pieces of said first type of the block member forming the display element $D_{ij}$ differ in length from the magnetic piece of said second type.

4. A display element for a display panel, which is formed with a block member with uniform cross section having an outer periphery forming a plurality of display surfaces of different colors to form a plurality of edges parallel to and around an axis extending in the horizontal direction, a magnetic piece of a first type disposed in each of the edges except one of them and a magnetic piece of a second type disposed near the remaining edge.

5. A display element according to claim 4 wherein the block member is a four-sided right prismatic member, and hence has four parallel edges and four display surfaces and has three magnetic pieces of said first type.

6. A display element according to claim 4 wherein the magnetic pieces of said first type differ in length from the magnetic piece of said second type.

* * * * *